United States Patent Office 3,530,127
Patented Sept. 22, 1970

3,530,127
TRIAZINE DERIVATIVES
Hans Rudolf Biland, Gelterkinden, Karl Eschle, Basel, Christian Luethi, Muenchenstein, and Max Duennenberger, Frenkendorf, Switzerland, assignors to Ciba Limited, Basel, Switzerland, a company of Switzerland
No Drawing. Filed July 30, 1968, Ser. No. 748,608
Claims priority, application Switzerland, Aug. 4, 1967, 11,012/67
Int. Cl. C07d 55/12, 55/18, 55/20
U.S. Cl. 260—248                    9 Claims

ABSTRACT OF THE DISCLOSURE

The invention concerns new triazine derivatives having outstanding antioxidative properties and having the formula

wherein $Z_1$ stands for H, alkyl, alkoxy, phenyl or halogen, $Z_2$ for H or alkyl, $R_1$ and $R_1'$ denote a branched-chain alkyl of at least 3 carbon atoms, $R_2$ and $R_2'$ stand for H, halogen or alkyl and X and Y denote —O— or —NH—.

---

The present invention relates to selected new triazine derivatives which contain one directly bonded phenyl residue and two phenyl residues bonded via a hetero-atom bridge, an advantageous process for the manufacture of such compounds, as well as their use as antioxidants.

The triazine derivatives according to the invention correspond to the formula (1)

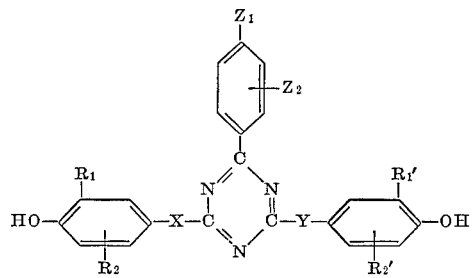

wherein $Z_1$ represents a hydrogen atom, an alkyl group containing 1 to 4 carbon atoms, an alkoxy group containing 1 to 4 carbon atoms, a phenyl group or a halogen atom, $Z_2$ represents hydrogen, an alkyl group containing 1 to 4 carbon atoms or a halogen atom, $R_1$ and $R_1'$ denote a branched-chain alkyl group having 3 to 8 carbon atoms, $R_2$ and $R_2'$ denote hydrogen, halogen or an alkyl group containing 1 to 8 carbon atoms, and X and Y denote a bridge member —O— or —NH—.

Within the framework of the above Formula 1, those triazine derivatives are of predominant significance in which the phenyl residues bonded via hetero-atoms (to suit the definitions given) are substituted in the same manner and in which these phenyl residues are also bonded to the triazine ring by similar hetero-atoms. Such triazine compounds then correspond—with simultaneous selection of preferred possibilities of substitution—to the formula (2)

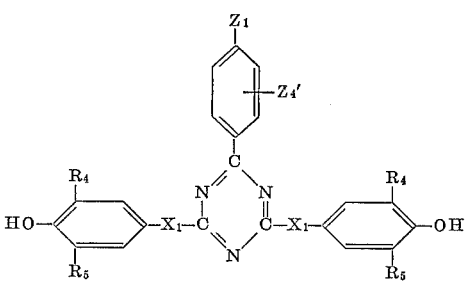

wherein $Z_3$ denotes hydrogen, a methyl group, a tert.butyl group, a methoxy group, a phenyl group, chlorine or bromine, $Z_4$ denotes hydrogen or chlorine, $R_3$ represents hydrogen or a preferably branched-chain alkyl group containing 1 to 8 carbon atoms, and the symbols $X_1$ both represent either a bridge member —O— or —NH—.

Within Formula 1, those compounds which correspond to the formula (3)

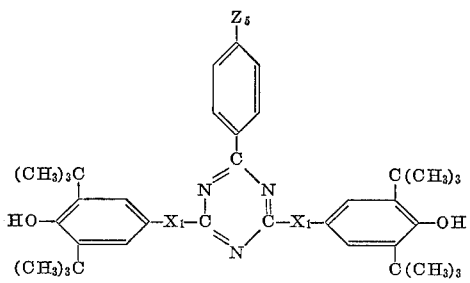

are of outstanding interest, wherein $Z_1$ represents a hydrogen atom, an alkyl group containing 1 to 4 carbon atoms, an alkoxy group containing 1 to 4 carbon atoms, a phenyl group or a halogen atom, $Z_4'$ denotes hydrogen, chlorine or an alkyl group having 1 to 4 carbon atoms, $R_4$ and $R_5$ are identical or different and represent an alkyl group containing 1 to 4 carbon atoms, and both symbols $X_1$ represent a bridge member —O— or —NH—.

Further sub-groups of compounds according to Formula 1 which have particular practical significance are: compounds of formula (4)

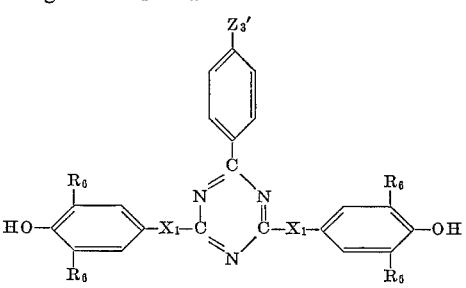

wherein $Z_5$ represents hydrogen or chlorine and the symbols $X_1$ both denote either a bridge member —O— or a bridge member —NH—, as well as compounds corresponding to the formula (5)

wherein $Z_3'$ represents hydrogen, an alkyl group containing 1 to 4 carbon atoms, a methoxy group, chlorine, bromine or a phenyl group, and $X_1$ denotes a bridge member —O— or —NH—, and $R_6$ represents a tert.butyl group or isopropyl group.

The triazine derivatives characterised above may be manufactured analogously to methods which are in themselves known. In the general case where X and Y are different, an appropriate process for the manufacture of compounds of Formula 1 consists in first reacting a triazine compound of formula (6) 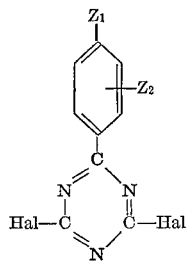

in an aqueous solvent which is miscible with water and chemically inert towards the reagents, in approximately equimolecular amount, with a compound of formula (7) 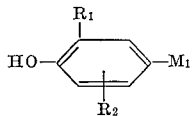

wherein $M_1$ represents a group —$NH_2$, —OH or —O-alkali metal at temperatures below 60° C., and thereafter reacting it at temperatures above 50° C. with a compound of formula (8) 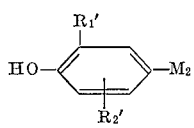

wherein $M_2$ represents a group —$NH_2$, —OH or —O-alkali metal, and, in the cases in which $M_1$ and/or $M_2$ denote a group —$NH_2$ or —OH, carrying out the reaction in the presence of acid acceptors; further, $Z_1$, $Z_2$, $R_1$, $R_1'$, $R_2$ and $R_2'$ in these formulae have the significance given above and Hal represents a chlorine or bromine atom.

In the case of the manufacture of triazine compounds having symmetrical substitution as regards the phenyl residues bonded via $X_1$, that is to say the manufacture of compounds according to Formulae 2 to 5, the two process stages for the introduction of each phenyl residue bonded via a heteroatom can be combined into a single process stage. In this case a triazine compound of formula (9) 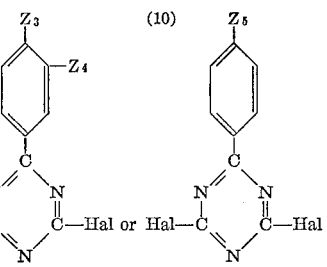 (10) 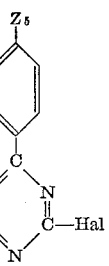

is then reacted, in an aqueous solvent which is miscible with water and chemically inert towards the reagents, at temperatures between 20 and 100° C., with, in each case, a two-fold molar quantity of a compound of formula

(11) 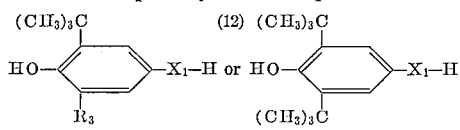 (12) 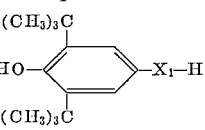

in the presence of acid acceptors, or reacted with an alkali salt of the compounds of Formulae 11 or 12, with $Z_3$, $Z_4$, $Z_5$, $R_3$ and $X_1$ having the significance given above and Hal representing a chlorine or bromine atom.

It is also entirely possible to work in an anhydrous medium by reacting the compounds of Formulae 9 or 10 in an inert solvent (such as for example monochlorobenzene, dichlorobenzene or trichlorobenzene at an elevated temperature (for example 80 to 180° C.) with compounds of Formula 11 or 12, appropriately in the presence of small quantities (up to about 0.2 mol equivalent) of aluminum chloride or one equivalent of an acid acceptor such as for example $NaHCO_3$.

The dihalogenotriazines to be used as starting substances for the present process are accessible in a manner which is in itself known, such as is for example described in British patent specification 1,073,290, French patent specification 1,310,810, German Auslegeschrift 1,178,437 or British patent specification 991,309.

Possible solvents which are chemically inert (towards the reagents) and are miscible with water are above all cyclic ethers such as dioxan, ketones such as acetone or methyl ethyl ketone, or also their mixtures with water.

The water content of such water-solvent mixtures is appropriately 0 to 50% but a higher water content is not troublesome as long as the starting materials remain dissolved therein.

The following compounds may for example be mentioned as acid acceptors: sodium hydroxide, potassium hydroxide, ammonia and sodium carbonate. They are normally employed in quantities which correspond to the amount of acid which is theoretically to be bonded, and they are appropriately added to the system in such a way that the pH-value of the reaction mixture does not rise above 9, that is to say the hydrohalic acid formed in the reaction is continuously removed.

The compounds of Formula 1 are suitable for stabilising oxidation-sensitive organic materials against oxidation. For this purpose, they can be used for the following substrates in a manner which is in itself known: homopolymers and copolymers of ethylenically unsaturated compounds such as vinyl chloride, vinylidene chloride, styrene, butadiene, isoprene, ethylene, propylene, acrylic and methacrylic acid derivatives, for example acrylic acid alkyl esters, acrylamides and acrylonitrile; polyamides, for example made from ε-caprolactam or from adipic acid and a diamine; polyesters such as poly-terephthalic acid glycol ester; natural and synthetic rubbers; lubricating oils; petrol; vegetable and animal oils and fats; waxes; cellulose and cellulose derivatives such as cellulose esters.

In general, small quantities of the compounds of Formula 1, of 0.01 to 2% relative to the quantity of the substrate to be protected, suffice for a good antioxidant action. The antioxidants may for example be incorporated directly into the materials to be protected, that is to say incorporated by themselves, or incorporated together with other additives such as plasticisers, pigments, optical brighteners and/or other antioxidants, with the aid of solvents.

In many cases a synergic antioxidant action can be achieved by the combined use of the antioxidants to be used according to the invention with ultra-violet absorbing agents which are in themselves known (for example of the type of the benzophenones, benztriazoles, salicylates or oleic acid diamides).

In the examples which follow the parts denote parts by weight and the percentages denote percentages by weight, unless otherwise stated.

EXAMPLES OF MANUFACTURE 26 parts of 2-(4'-chlorophenyl)-4,6-dichloro-1,3,5-triazine together with 45 parts of 2,6-di-tert.butylhydroquinone are dissolved in 300 parts of dioxan and 10 parts of water. 190 parts in 1 N sodium hydroxide solution are added dropwise to this solution at 60 to 70° C. in such a way that the pH value does not rise above 7.5. Thereafter the mixture is cooled to 10° C. and the oil which has separated out is extracted with methylene chloride. The dried methylene chloride extracts yield 66 parts of oil as a crude product. Chromatography on aluminum oxide (activity 1) using benzene leads to a crystalline product of formula (13)

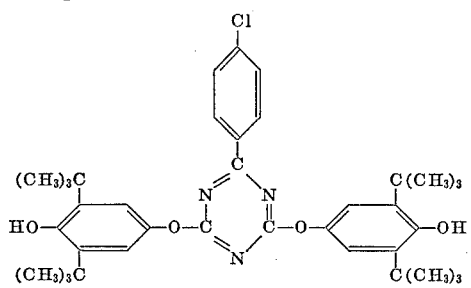

Melting point: 290 to 292° C. (from chloroform-hexane).

*Analysis.*—Calculated (percent): C, 70.29; H, 7.33; N, 6.65. Found (percent): C, 70.50; H, 7.28; N, 6.57.

The following compounds may be manufactured in an analogous manner:

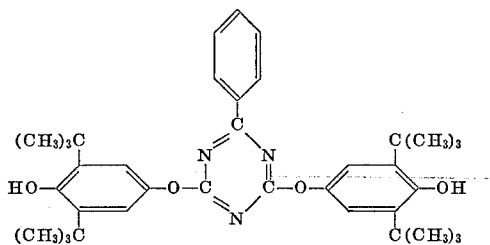

Melting point: 238 to 239° C. (from chloroform-petroleum ether.

*Analysis.*—Calculated (percent): C, 74.34; H, 7.93; N, 7.03. Found (percent): C, 73.97; H, 7.91; N, 7.00.

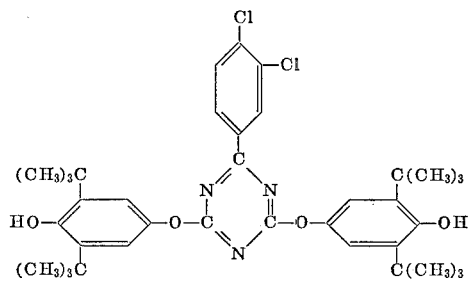

Melting point: 213 to 214° C.

*Analysis.*—Calculated (percent): C, 66.66; H, 6.80; N, 6.30. Found (percent): C, 66.77; H, 7.07; N, 6.21.

The compounds listed in Table I below can be manufactured in an entirely analogous manner; in this table the entries denote the following:

Column 1: Formula number
Column 2: Structural formula
Column 3: Melting point in ° C. (uncorrected)
Column 4: Analysis (1st line calculated (percent), 2nd line found (percent)).

| 1 | 2 | 3 | 4 | | |
|---|---|---|---|---|---|
| 16 | ![structure with OCH3 para-substituent] | 261–263 | 72.70<br>72.63 | 7.87<br>8.01 | 6.69<br>6.70 |
| 17 | ![structure with C(CH3)3 para-substituent] | 233–234 | 75.31<br>75.38 | 8.48<br>8.54 | 6.43<br>6.39 |
| 18 | ![structure with Br para-substituent] | 296–298 | 65.67<br>65.99 | 6.85<br>6.95 | |

| | 2 | 3 | 4 | | |
|---|---|---|---|---|---|
| 19 | 2,4-bis(3,5-di-tert-butyl-4-hydroxyphenoxy)-6-(4-biphenylyl)-1,3,5-triazine | 220–222 | 76.64<br>76.37 | 7.63<br>7.63 | 6.24<br>6.46 |
| 20 | 2,4-bis(3,5-di-tert-butyl-4-hydroxyphenoxy)-6-(3,4-dimethylphenyl)-1,3,5-triazine | 239–240 | 74.84<br>74.95 | 8.21<br>8.26 | 6.72<br>6.85 |
| 21 | 2,4-bis(3,5-diisopropyl-4-hydroxyphenoxy)-6-(4-chlorophenyl)-1,3,5-triazine | 224–226 | 68.80<br>69.24 | 6.65<br>6.83 | 7.29<br>7.26 |
| 22 | 2,4-bis(3,5-di-tert-butyl-4-hydroxyanilino)-6-phenyl-1,3,5-triazine | 234–236 | 74.58<br>74.32 | 8.29<br>8.22 | 11.76<br>11.93 |
| 23 | 2,4-bis(3,5-di-tert-butyl-4-hydroxyanilino)-6-(4-chlorophenyl)-1,3,5-triazine | 242–246 | 70.51<br>70.23 | 7.68<br>7.69 | 11.11<br>10.92 |
| 24 | 2,4-bis(3,5-di-tert-butyl-4-hydroxyanilino)-6-(4-bromophenyl)-1,3,5-triazine | 264–267 | 65.86<br>66.26 | 7.17<br>7.13 | 10.38<br>10.48 |

TABLE—Continued

| 1 | 2 | 3 | 4 | | |
|---|---|---|---|---|---|
| 25 | 2,4-bis(3,5-di-tert-butyl-4-hydroxyanilino)-6-(2,4-dimethylphenyl)-s-triazine | 212–214 | 75.08<br>75.02 | 8.56<br>8.80 | 11.23<br>11.24 |
| 26 | 2,4-bis(3,5-di-tert-butyl-4-hydroxyanilino)-6-(4-biphenylyl)-s-triazine | 302–304 | 76.86<br>77.09 | 7.95<br>8.03 | 10.42<br>10.66 |
| 27 | 2,4-bis(3,5-diisopropyl-4-hydroxyanilino)-6-phenyl-s-triazine | 143–145 | 73.44<br>73.66 | 7.66<br>7.85 | 12.98<br>13.09 |
| 28 | 2,4-bis(3,5-diisopropyl-4-hydroxyanilino)-6-(4-chlorophenyl)-s-triazine | 203–205 | 69.03<br>68.77 | 7.02<br>7.08 | 12.20<br>12.26 |
| 29 | 2,4-bis(3-tert-butyl-4-hydroxy-5-methylanilino)-6-phenyl-s-triazine | 148–151 | 72.77<br>73.00 | 7.29<br>7.44 | 13.69<br>13.48 |
| 30 | 2,4-bis(3-tert-butyl-4-hydroxy-5-methylanilino)-6-(4-chlorophenyl)-s-triazine | 199–200 | 68.18<br>67.97 | 6.64<br>6.55 | 12.82<br>12.88 |

TABLE—Continued

| | Compound | M.P. (°C) | C found/calc | H found/calc | N found/calc |
|---|---|---|---|---|---|
| 31 | 2,4-(3',5'-di-tert.butyl-4-hydroxyphenyloxy)-(3',5'-di-tert.butyl-4-hydroxyphenylamino)-6-(4'-chlorophenyl)-1,3,5-triazine (with 3-methyl substituents) | 269–270 | 70.40 / 70.70 | 7.50 / 7.74 | 8.88 / 9.17 |

Use Examples (I) A mixture of 100 parts of unstabilised polypropylene (Profax 6501, Hercules Powder) and 0.2 part of a compound according to the table below is worked into a hide on a calender at 170° C. and is subsequently pressed at 230° C. and a pressure of 40 kg./cm.² to give a 1 mm. thick sheet. The sheets thus obtained are subjected to an accelerated oxygen ageing at 140° C. (air, normal pressure). The time which elapses until the first visually perceptible cracks occur is a measure of the antioxidant action of the compound added.

TABLE A

Compound added:

Time to crack formation in hours at 140° C.

Without additive _____ 5
(A) Commercial antioxidants:
    2,6-di-tert. butyl-4-methylphenyl _____ 25
    Methylene-bis - (3-methyl - 4-hydroxy-5-tert. butylbenzene) _____ 28
    Thio-bis - (2-methyl - 4-hydroxy - 5-tert. butylbenzene) _____ 100
    2,4 - (3',5' -di-tert. butyl - 4-hydroxyphenylamino - 6-octylmercapto - 1,3,5-triazine __ 260
(B) Compound according to the invention, Formula 13:
    2,4 - (3',5' - di-tert. butyl - 4-hydroxyphenyloxy) - 6-(4'-chlorophenyl) - 1,3,5-triazine _____ 350

(II) Polypropylene sheets are freshly manufactured in accordance with application Example I and cut into small pieces. 5 g. at a time of these pieces are heated to 160° C. in a pure oxygen atmosphere in a reaction tube connected to an absolute manometer, and the pressure drop as a function of time is recorded graphically. The gaseous oxidation products which result are removed from the gas phase by means of a Linde molecular sieve 5 A and solid potassium hydroxide, so that the pressure measured corresponds to the residual pure oxygen. Table B below records, as a measure of the antioxidant action of the compounds added, the time which elapses (=induction time) before the strong oxygen consumption (rapid rise of the curve) commences.

TABLE B

Compound added:

Induction time in minutes at 160° C.

Without additive _____ 2
(A) Commercial antioxidants:
    2,5 -di-tert. butyl - 4-methylphenol _____ 12
    Methylene-bis - (3-methyl - 4-hydroxy - 5-tert. butyl-benzene) _____ 44
    Thio-bis - (2-methyl - 4-hydroxy - 5-tert. butylbenzene) _____ 235
(B) Compound according to the invention, Formula 13:
    2,4 - (3',5' - di-tert. butyl - 4-hydroxyphenyloxy) - 6-(4'-chlorophenyl) - 1,3,5-triazine _____ 445

(III) Polypropylene sheets are manufactured according to application Example I and are exposed for 1000 hours in a Xenotest instrument.

Whilst the sheets containing 2,4-(3',5'-di-tert.butyl-4-hydroxyphenylamino)-6-octylmercapto-1,3,5 - triazine as the additive first turn brown and then are again bleached, the sheets containing 2,4-(3',5'-di-tert.butyl-4-hydroxyphenyloxy) - 6 - (4'-chlorophenyl)-1,3,5-triazine (compound of Formula 13 according to the invention) remain colourless during the whole exposure time.

(IV) Demonstration of the oxidation inhibitor action by means of the peroxide number.

Freshly distilled olive oil is oxidised for 20 minutes at 140° C. in a stream of pure oxygen. In order to determine the peroxide number iodometrically, 1 g. of the olive oil which has been treated in this way is dissolved in a mixture of 20 ml. of carbon tetrachloride, 20 ml. of chloroform and 20 ml. of glacial acetic acid (freshly distilled). The gaseous dissolved oxygen is driven out by means of a strong stream of nitrogen, after which 1 ml. of saturated potassium iodide solution is added. The mixture is then stirred vigorously for 5 minutes under a nitrogen atmosphere, during which the separation of iodine takes place. After adding 100 ml. of freshly distilled water and a little starch solution as the indicator, the titration is immediately carried out with 0.002 N sodium thiosulphate solution until the blue colour disappears. The peroxide number P (mval. of peroxidic oxygen per kg. of olive oil) is determined as follows:

P=ml. consumed sodium thiosulphate solution ×2

The number of ml. of thiosulphate effectively consumed must, where appropriate, be determined by measuring the difference between the sample and reagent solutions.

TABLE C

Peroxide number

Olive oil, without additive, freshly distilled _____ 0
Olive oil, without additive, oxidised for 20 minutes _____ 48
Olive oil with 0.2% of 2,6-di - tert.butyl - 4 methylphenol _____ 40
Olive oil with 0.2% of 2,4-(3',5'-di-tert.butyl-4-hydroxyphenyloxy-6-(4'-chlorophenyl)-1,3,5 - triazine [Compound of Formula 13] _____ 32

(V) A mixture of 100 parts of high pressure polyethylene of density 0.92 (extracted with ether in order to remove any possible additives originating from the manufacture) and 0.2 part of one of the compounds listed according to Table D below is calendered for 5 hours on a calender at 140° C. The material taken off the calender roll (as a hide when additives are present, and as a sticky mass without additives) is then finely divided. The test material thus obtained is thereafter tested for its flow properties at a high temperature under standardised conditions in accordance with ASTM Specification D-1238-62T (Condition E, that is to say 190° C., 2.16 kg. pressure). The amount obtained after flowing through the standardised nozzle over the course of 10 minutes represents the so-called melt index. The values thus obtained give a representative picture of the protective action of the additives and hence of the improvements of the polyethylene which are possible under practical processing conditions.

TABLE D

| | Calender ring time in hours | Melt index |
|---|---|---|
| Without additive | 0 | 5.6 |
| Without additive | 5 | 3.6 |
| Compound No. 30 | 5 | 5.4 |
| Compound No. 31 | 5 | 5.2 |
| Compound No. 13 | 5 | 5.6 |
| Compound No. 23 | 5 | 5.4 |
| Compound No. 22 | 5 | 5.4 |

Similar results to those described in the preceding use Examples I to V are obtained with the other compounds of Table I to the extent that they show adequate solubility in the substrate in question.

(VI) A synergically antioxidant action can be detected in a light exposure test of rigid polyvinyl chloride sheets which in addition to compounds of, for example, Formulae 13, 22 or 23 also contain ultra-violet absorption agents of the benzophenone, benztriazole, salicylate or oxalic acid diamide type.

A mixture of suspension polyvinyl chloride of K-value 60 and commercial heat stabilisers, lubricants and ultra-violet absorption agents, according to the following formulation, is used for this purpose.

| | Parts |
|---|---|
| Suspension poylvinyl chloride | 100 |
| A sulphur-containing tin stabiliser | 2 |
| A lubricant based on esters of higher fatty acids | 2 |
| An ultra-violet absorption agent of the benzophenone, benztriazole or salicylate type | 0.5 |
| One of the compounds of Formulae 13, 22 or 23 | 0.2 |

This mixture is processed into a hide on a calender at 170° C. and is subsequently pressed in a press at 180° C. and a pressure of 40 kg./cm.² to give a 1 mm. sheet. Sheets manufactured in this way are then exposed for 3000 hours in a Xenotest 150 instrument.

RESULTS

| | Number of hours after which visible change (brown discolouration) occurs |
|---|---|
| Without additive | 800 |
| With ultra-violet absorption agent, without antioxidant | 2000 |
| Without ultra-violet absorption agent, with antioxidant | 900 |
| With ultra-violet absorption agent, with antioxidant | > 3000 |

We claim:
1. A triazine derivative of the formula

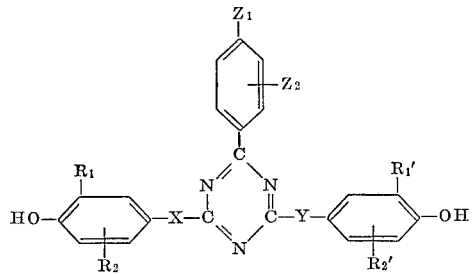

wherein $Z_1$ represents a hydrogen atom, an alkyl group containing 1 to 4 carbon atoms, an alkoxy group containing 1 to 4 carbon atoms, a phenyl group or a halogen atom, $Z_2$ represents hydrogen, an alkyl group containing 1 to 4 carbon atoms or a halogen atom, $R_1$ and $R_1'$ denote a branched-chain alkyl group having 3 to 8 carbon atoms, $R_2$ and $R_2'$ represent hydrogen, halogen or an alkyl group containing 1 to 8 carbon atoms, and X and Y denote a bridge member —O— or —NH—.

2. A triazine according to claim 1, of the formula

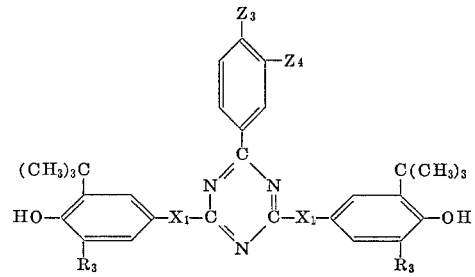

wherein $Z_3$ denotes hydrogen, a methyl group, a tert. butyl group, a methoxy group, a phenyl group, chlorine or bromine, $Z_4$ denotes hydrogen or chlorine, $R_3$ represents hydrogen or an alkyl group which contains 1 to 8 carbon atoms and preferably has a branched chain, and the symbols $X_1$ both represent either a bridge member —O— or a bridge member —NH—.

3. The compound according to claim 2 wherein $Z_3$ and $Z_4$ are chlorine, $R_3$ is t-butyl, and $X_1$ is —O—.

4. A triazine according to claim 1, of the formula

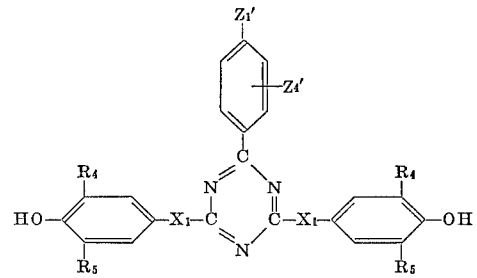

wherein $Z_1'$ represents a hydrogen atom, an alkyl group containing 1 to 4 carbon atoms, an alkoxy group containing 1 to 4 carbon atoms, a phenyl group or a halogen atom, $Z_4'$ denotes hydrogen, chlorine or an alkyl group having 1 to 4 carbon atoms, $R_4$ and $R_5$ are identical or different and represent an alkyl group containing 1 to 4 carbon atoms and both symbols $X_1$ represent a bridge member —O— or —NH—.

5. A triazine derivative according to claim 1 of the formula

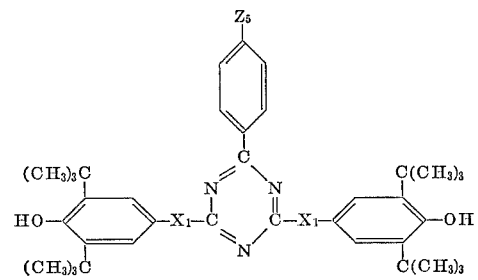

and wherein $Z_5$ represents hydrogen or chlorine and the symbols $X_1$ both denote either a bridge member —O— or a bridge member —NH—.

6. The compound according to claim 5 wherein $Z_5$ is hydrogen and $X_1$ is —O—.

7. A triazine derivative according to claim 1 of the formula

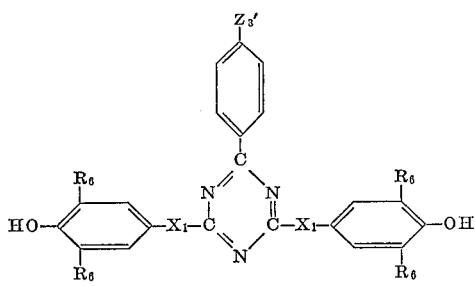

wherein $Z_3'$ represents hydrogen, an alkyl group containing 1 to 4 carbon atoms, a methoxy group, chlorine, bromine or a phenyl group, and $X_1$ denotes a bridge member —O— or —NH—, and $R_6$ represents a tert. butyl group or isopropyl group.

8. The compound according to claim 7 wherein $Z_3'$ is bromine, $R_6$ is t-butyl, and $X_1$ is —O—.

9. The compound according to claim 7 wherein $Z_3'$ is chlorine, $R_6$ is isopropyl and $X_1$ is —O—.

References Cited

UNITED STATES PATENTS

| | | | |
|---|---|---|---|
| 2,671,786 | 3/1954 | Scalera et al. | 260—249.5 XR |
| 3,245,992 | 4/1966 | Dexter et al. | 260—249.8 XR |
| 3,397,205 | 8/1968 | Luethi et al. | 260—249.5 XR |
| 3,407,201 | 10/1968 | Luethi et al. | 260—249.5 XR |

HENRY R. JILES, Primary Examiner

J. M. FORD, Assistant Examiner

U.S. Cl. X.R.

99—163; 252—50, 401; 260—45.8, 249.5, 249.9